Oct. 11, 1960 C. E. THEOBALD, JR 2,955,362
SYSTEM FOR SIMULATING AIRCRAFT PEDAL DEFLECTION
Filed July 17, 1957
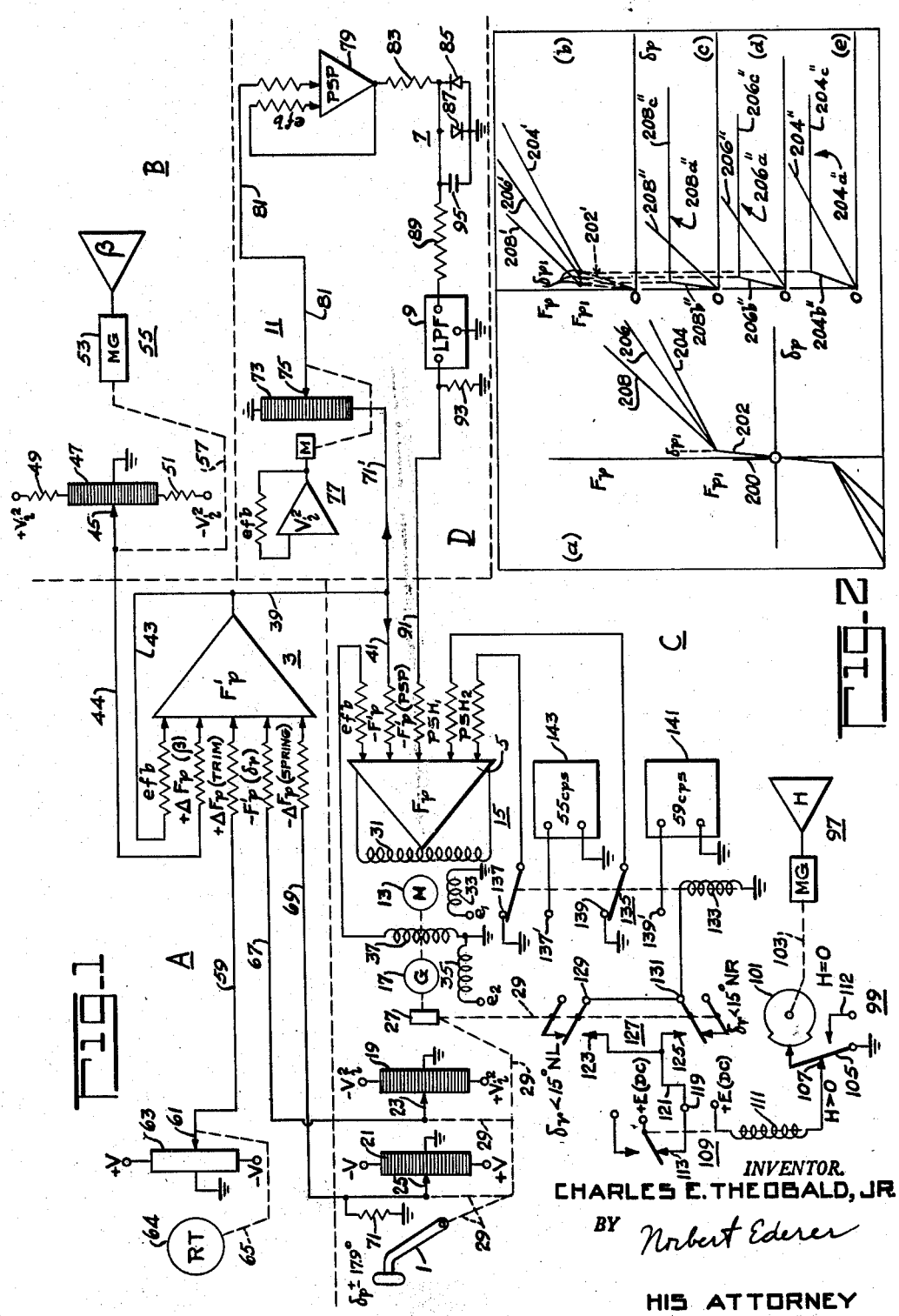
INVENTOR.
CHARLES E. THEOBALD, JR.
BY Norbert Ederer
HIS ATTORNEY

United States Patent Office 2,955,362
Patented Oct. 11, 1960

2,955,362

SYSTEM FOR SIMULATING AIRCRAFT PEDAL DEFLECTION

Charles E. Theobald, Jr., Longmeadow, Mass., assignor to Curtiss-Wright Corporation, a corporation of Delaware Filed July 17, 1957, Ser. No. 672,441

7 Claims. (Cl. 35—12)

This invention relates to aircraft training apparatus and more particularly to control loading apparatus for realistically simulating the dynamic resistance forces experienced by a pilot in operating an aircraft control during actual flight.

The resistance forces experienced in operating a flight control may for purposes of this invention be generally grouped as aerodynamic resistance forces and spring resistance forces. Simulating apparatus for accurately producing aerodynamic and spring resistance forces to control operation are well known in the art; this invention is directed to simulation of the resistance force of a control provided with a preload spring, such as the rudder pedal in a DC7C airplane. As the pilot operates the rudder in a DC7C, with initial application of pedal force there is no appreciable pedal deflection until a minimum threshold force has been exerted.

It is an object of the invention to provide flight simulating apparatus realistically producing resistance forces to control operation including the resistance force due to the preload spring.

Another object of the invention is to produce the effect of a control preload spring by electrical (as opposed to purely mechanical) means.

These and other objects of the invention will be understood more readily by reference to the following detailed description considered together with the accompanying drawing in which:

Fig. 1 is a schematic illustration of control loading circuitry in accordance with the invention;

Fig. 2 is a graphic illustration of force v. deflection relations produced by elements in the apparatus of Fig. 1.

For a general understanding of the invention, reference should first be made to Fig. 2 in which there are shown a series of curves in a Cartesian coordinate system with pedal deflection ($\delta_p$) as independent variable and pedal force ($F_p$) as dependent variable. Each of the curves in Fig. 2 is symmetrical with respect to the origin and for this reason the third quadrant part of the curve is shown only in Fig. 2a and is omitted in the remaining Figs. 2b to 2e. The origin represents the neutral position of the rudder pedals, which in simulation of the actual aircraft are provided in the trainer as a coacting pair operable in see-saw fashion. For simplicity only one pedal is indicated as at 1 in Fig. 1, but it should be understood that depression of one pedal concurs with equi-angular displacement from neutral of the other pedal in the opposite direction. Therefore a negative force should not necessarily be interpreted as a force tending to aid rather than resist the pilot; rather a negative force principally signifies the deflection force which the pilot must exert to cause a nose-left movement of the simulated craft in overcoming pedal (and also rudder) spring forces and aerodynamic forces in opposition to deflection. Conversely a positive force signifies a nose-right pilot effort. Simulated spring and aerodynamic forces are computed electrically by the apparatus shown in Fig. 1 wherein the force variables are represented by alternating voltages of line frequency having a magnitude proportional to force magnitude and are either in phase or in phase-opposition to a reference voltage, as indicated by a (+) and a (−) sign respectively. A positive phase signifies a "negative" effort on the part of the pilot tending to cause nose-left movement of the simulated aircraft.

The pedal force-pedal deflection characteristic in an actual airplane, such as the DC-7C, are illustrated in Figs. 2a. Only the first quadrant relations will be discussed, it being understood that the third quadrant relations are symmetrical with respect to the origin. In the ideal case, as the pilot begins to exert an increasing force on the pedal there should be no pedal deflection in view of pre-loading of the spring. This ideal relation is illustrated by the heavy line 200 on the $F_p$ axis. In practice there occurs a limited deflection even for the region of overcoming the pre-load force. This is illustrated by the line segment 202 which has a very steep slope. At a predetermined threshold force $F_{p1}$ (corresponding to a threshold deflection angle $\delta_{p1}$) the pilot has overcome the pre-loading resistance force and the further relations between pedal force and deflection are illustrated by a family of straight line curves labeled respectively 204, 206 and 208. It should be noted that the curve 202 is independent of aerodynamic factors. On the other hand beyond the region of pre-load resistance the force exerted by the pilot to realize a desired deflection depends on aerodynamic factors and is the greater, the greater the aerodynamic force of resistance. For each of the curves 204, 206 and 208 it is assumed that the aerodynamic factors are constant. Curve 204 may illustrate for example the relation of force to deflection for a grounded plane, i.e., where the aerodynamic resistance forces are nil; curve 206 illustrates the relation for the case of moderate effect of (a constant) aerodynamic factor; and curve 208 illustrates the relation under condition of a high effect of (a constant) aerodynamic factor.

In the preceding paragraph it was assumed that the pedal was initially in the neutral position. This is not the only possible position for which the pedal force is zero. In the actual aircraft a trim wheel is provided that is operable to relieve the force required to be exerted on the pedal to the extent desired, including relief down to zero force. For example, the pilot may have deflected the pedal first as defined by the characteristic 202, and thereafter as defined by characteristic 206 up to the desired deflection. He may wish to maintain such desired deflection but relieve the required force totally. To this end he would operate the trim wheel and feel that the resistance force was gradually diminishing ultimately to zero. Upon achieving such total relief he may remove his foot from the pedal completely and yet the pedal would remain in the aforesaid desired deflected position. A graphical representation of these force-deflection relations in Fig. 2(a) would be a vertical line corresponding to such desired deflection and commencing on curve 206 and terminating at the $\delta_p$ axis. This latter point will be referred to as the "translated origin." Thus although the deflection has been maintained at the desired non-zero value, the force has reverted to zero.

Assuming that thereafter the pilot wished to deflect the pedal even beyond the aforesaid desired position, he would now once more need to overcome the resistance of the pre-load spring prior to realizing any appreciable further deflection. A graphical representation of these events in Fig. 2(a) would be first a line segment parallel to and of equal length as segment 202, i.e. beginning at the translated origin and terminating at the threshold force ordinate $F_{p1}$, and thence along a curve parallel to curve 206 up to the newly desired deflection value. In effect the force-deflection characteristics are translated from a position relative to the origin corresponding to zero deflection to a position relative to the translated origin.

It is therefore apparent that the determination as to whether a steep slope-segment, such as 202, or a moderate slope-segment such as 206 is to be traced is primarily a function, not of the variable $\delta_p$, but the variable $F_p$. In the computing system for simulation of these effects the variable $\delta_p$ is an independent variable, whereas the variable $F_p$ is the dependent variable.

The corresponding force-deflection relations for the simulator are illustrated in Fig. 2b wherein like reference numerals (followed by a prime) identify corresponding relations in Fig. 2a. As shown in Fig. 2b, the curves beyond the region of the pre-load spring force correspond rather accurately to their respective relations in an actual plane as illustrated in Fig. 2a. However for simplicity in construction of the simulating circuitry, no attempt is made to produce a force response up to the threshold force $F_{p1}$ common to each of the three illustrated relation, i.e. independent of aerodynamic factors. Rather three separate line segments labeled collectively as 202' are produced which have steeper slopes with increased resistance force due to presence of an aerodynamic condition tending to produce greater resistance force, although the aerodynamic condition is constant along any given one of the three curves, the same as in Fig. 2a. Thus although the threshold force $F_{p1}$ is uniform in the simulator, the threshold pedal deflection angle $\delta_{p1}$ is variable and is maximum for the case of a simulation of a grounded aircraft and decreases with an increasing effect of aerodynamic factors; the slope of the pre-load response becomes steeper with increased aerodynamic effects. In Fig. 2b the separation of the three curves 202' is deliberately exaggerated for clarity, but in actual practice the shifting of the threshold angle $\delta_{p1}$ is so small as to be undiscernible by the student pilot.

The three responses illustrated in Fig. 2b are generated in the same manner; for clarity a separate graph is indicated for each in Figs. 2c, 2d, and 2e wherein like reference numerals (followed by double prime) indicate related responses in Fig. 2b. Fig. 2c is typical of the generation of these responses and will be discussed in greater detail. Referring also to Fig. 1, a force summing amplifier $F'_p$ indicated generally by 3, produces an output voltage $-F'_p$ in accordance with all the computed aerodynamic and spring forces except the spring force due to pedal spring pre-load. Such a computed force gives rise to a linear force-deflection curve 208'' which passes through the origin as indicated in Fig. 2c. The output voltage $-F'_p$ is fed to another computing summing amplifier $F_p$, designated as 5, and is also fed to a diode clipping or limiting network generally indicated at 7, thence through a low pass filter 9 for sine wave restoration, and ultimately also as an input $-F'_p(PSP)$ to the force summing amplifier 5. The response of the limiter 7 and filter 9 is illustrated by the curve 208a'' in Fig. 2c, and includes a portion increasing linearly from the origin 208b'' and a constant flat response portion 208c''. The portion 208b'' extends from the origin to the threshold angle $\delta_{p1}$ and the flat portion 208c'' is continued from said angle $\delta_{p1}$. The limiter 7 does not become effective until a minimum threshold voltage amplitude is exceeded and this gives rise to the portion 208b''. The flat response 208c'' is due to the combined action of the limiter 7, the low pass filter 9 and additional control means generally indicated at 11 and to be discussed hereinafter. The responses 208'' and 208a'' representing respectively response to aerodynamic forces and to spring forces excepting pre-load spring force on one hand $(-F'_p)$, and the response only to pre-load spring force on the other hand $(-F'_p(PSP))$, are summed by means of amplifier 5, and as summed applied by a servo torque motor 13 in opposition to the force exerted by the student pilot on the pedal 1.

The limiter 7 is effective to clip symmetrically the top and bottom of the incoming sine wave regardless which of the three responses is desired, provided a fixed threshold clipping voltage is exceeded. The low pass filter 9 off-sets the effect of the limiter 7 to a certain extent in the following manner: As the input voltage to the limiter 7 increases, the squaring action becomes more and more pronounced. As is well known from Fourier series theory, as the clipped wave approaches a square wave, its fundamental sine wave content increases to a limiting amplitude of $$\frac{4}{\pi}$$

times the amplitude of the square wave. The responses 208c'', 206c'' and 204c'' are therefore not absolutely flat, but with increasing voltage delivered to the limiter 7 the fundamental content of the squared wave continues to increase and the low pass filter 9 delivers an output which increases with increasing pedal deflection, at a slow rate to be sure, but nevertheless increases. This effect may be neglected over the usual operating range.

The gain control means 11 is provided to prevent the slope of the curves 202' from becoming excessively steep with increased air speed; this is desirable, for with excessive steepness the position of the motor 13 would become indeterminate as the said motor 13 would not "know" which particular ordinate of force corresponded to the required pedal deflection and therefore would tend to hunt. The principal aerodynamic factor tending to produce more and more resistance to pedal deflection is the factor of air speed and more accurately air speed squared. The gain control means 11 as will be seen hereinafter include means controlled according to air speed squared for controlling the input to the limiter 7 in such a manner that the higher the air speed the lesser the fraction of voltage $-F'_p$ (derived from the amplifier 3 and) ultimately delivered to the limiter 7. In this manner the threshold clipping voltage for limiter 7 corresponds to an output voltage $-F'_p$ produced by the amplifier 3, which is maximum for the case of a grounded simulated aircraft and decreases with increased resistance force due to air speed squared.

The operation of the apparatus in Fig. 1 will now be described in greater detail. The amplifier 5 and servo torque motor 13 are part of a pedal force $(F_p)$ servo system generally indicated at 15. Amplifier 5 and servo system 15 are typical of the other amplifiers and servo systems used herein and the following detailed description thereof will be sufficient for an understanding of other amplifiers and servo systems. Referring to the $F_p$ servo as an example of the various servo systems, such servo includes the servo amplifier 5 to which are applied a number of controlled voltages hereinafter referred to in detail, the motor 13 responsive to the amplifier output, a feedback generator 17 driven by the motor 13, and a number of potentiometers as for example 19 and 21 having slider contacts 23 and 25 respectively which are connected through a gear reduction box 27 and connections generally indicated as 29 to the motor generator combination. Servo amplifier 5 is a summing amplifier for determining the resultant of the input voltages and is of a well-known type in the art for algebraically summing a plurality of A.C. voltages of varying magnitude and polarity. A detailed circuit illustration of the servo amplifier is therefore unnecessary.

As indicated, the output of the amplifier is used to control a servo network including a motor-generator set which is shown in some detail for the $F_p$ servo, but is diagrammatically illustrated and designated as M.G. for simplicity in other parts of the drawing. The servo motor 13 is of the two phase type having a controlled phase 31 which is energized by the amplifier output, and another phase 33 which is energized by a constant A.C. voltage $e_1$ dephased 90° from the control voltage. It operates as a "torque" motor when its rotation is resisted by exertion of a deflection force on the pedal 1, to which it is mechanically connected by the connections 29 which include suitable linkages. When unrestrained by such pedal force, the motor 13 operates as a servo positioning motor and as such is typical of the operation of the other servo motors employed in the apparatus of Fig. 1. Its operation as a positioning motor is well known, rotation being in one direction when the phase angle between control and reference voltages is +90° and in the opposite direction when this phase angle is —90°. The rate of rotation depends upon the magnitude of the control voltage. Its operation as a torque motor is also well-known, the rate and direction being compulsorily controlled by the rate and direction of the deflection of the pedal 1.

In either mode of operation at least one voltage in accordance with the instantaneous position of the pedal 1 and therefore also of the motor 13 is continuously derived from a wiper of a potentiometer mechanically interconnected therewith, such as the wiper 25 of potentiometer 21. In the case of torque motor operation, the derived voltage reappears as an input of the servo amplifier 5, and ultimately across the winding 31 with a phase tending to restore the position of motor and pedal to their initial equilibrium positions when the student pilot discontinues application of a force to the pedal 1. The manner and circumstances under which a control loading motor such as 13 operates as a torque motor and as a positioning motor are described in greater detail in a pending application of Paul E. Grandmont for "Apparatus for Simulating Aircraft Control Loading and Feel," S.N. 510,119, filed May 13, 1955 now Patent No. 2,804,698, granted on September 3, 1957. The servo system at 15 is similar to the system described in the said Grandmont application.

It should be understood that rotation of motor 13, even when operating as a positioning motor, is usually transient and lasts only until a new equilibrium position has been reached as reflected by the control voltage across winding 31 attaining a value of zero, due to the algebraic summation of the input voltages to the amplifier 15 attaining a value of zero. While motor 13 is running, the control voltage across winding 31 generally decreases to zero as a result of continuous derivation of a voltage in accordance with the position of the motor, such as from the wiper 25. The derived voltage reappears as an input of the servo amplifier 5 with a phase tending to reduce to zero the summed voltage across winding 31, i.e. to restore equilibrium. Generally therefore the rate of rotation of motor 13 decreases continuously until the motor comes to a standstill. Generator 17 is provided to preclude overshoot beyond, and hunting about the required equilibrium position of standstill and is driven by the motor 13. It is a two phase generator having one phase 35 energized by a 90° de-phased A.C. reference voltage $e_2$, the other phase 37 generating according to the motor speed a feedback voltage $e_{fb}$ for purposes of velocity control.

The resistance elements of the potentiometers 19 and 21 of the $F_p$ servo and of the other potentiometers shown in the drawing may be of the well-known card type and are of circular band form in practice but are diagrammatically illustrated in plane development for clarity. A structural arrangement that may be used for a servo motor and potentiometer combination of the character above referred to is shown in Patent No. 2,341,749 issued December 2, 1947, to R. G. Grant for "Potentiometer Housing and Positioning Structure."

The slider contacts 23 and 25 of potentiometer cards 19 and 21 respectively are positioned along the cards by the servo motor 17 which connects with the slider contacts through gear reduction box 27 and the mechanical connections 29. The slider contacts derive, i.e. pick off potentiometer voltages depending on the respective contact position. Each potentiometer for the various servos shown in the drawing is shaped or contoured so that the derived voltages at the potentiometer contact bear a certain relationship to linear movement of the slider contacts depending on the particular function of the potentiometer, and has a voltage impressed across its terminals depending as to instantaneous polarity (i.e. in phase or phase opposition relation to a reference voltage) and magnitude also upon the function of the potentiometer. The potentiometers used in the apparatus of Fig. 1 are of uniform contour resulting in a linear change of voltage with change in potentiometer position.

The input voltages to the servo amplifier 5 are previously referred-to feedback voltage $e_{fb}$, the voltage $-F'_p$ representing summation of aerodynamic and spring resistance forces to pedal deflection less the resistance force due to pre-loading of the pedal spring, the voltage $-F'_p$ (PSP) representing the resistance force due to pre-loading of the pedal force, and two additional voltages $PSH_1$ and $PSH_2$, which will be discussed hereinafter and may for the time being assumed to be normally of zero value, so as not to contribute to the voltage across winding 31. The input voltage $-F'_p$ is fed from the output of the $F'_p$ amplifier 3 as previously indicated, over lines 39 and 41. A feedback voltage $e_{fb}$ is also fed from the output of amplifier 3 to an input thereof over line 43. The other input voltages to summing amplifier 3 are in order a voltage $+\Delta F_p(\beta)$ representing the aerodynamic effects of side-slip and air speed, the voltage $+\Delta F_p$ (Trim) representing the effect of position of the rudder trim wheel on pedal force, a voltage $-F'_p(\delta_r)$ representing the effect of rudder position on pedal force, and the voltage $-\Delta F_p$ (Spring) representing the effect of the pedal spring less pre-load. The derivation of these voltages will be considered in order.

The input voltage $+\Delta F_p(\beta)$ is derived from a line 44 connected to wiper 45 of a potentiometer card 47, whose center tap is grounded and whose ends are respectively connected through like resistors 49 and 51 to equal and opposite voltages $+V_i^2$ and $-V_i^2$, representing air speed squared. The voltages $+V_i^2$ and $-V_i^2$ may be derived for example as shown in the pending application of Stern and Theobald for "Apparatus for Simulating the Static System in an Aircraft" S.N. 503,055, filed April 22, 1955, now Patent No. 2,849,807, granted on September 2, 1958. The wiper 45 is positioned by a servo motor 53 of a side-slip ($\beta$) computing servo system generally indicated at 55 by means of connections generally indicated at 57. The inputs to the computing servo may be as shown in a patent of Richard C. Dehmel for "Flight Computing System and Apparatus," 2,842,867 granted on July 15, 1958. For the case of zero side-slip the wiper 45 is positioned at the grounded center tap of potentiometer 49, so that the input voltage $+\Delta F_p$ ($\beta$) to amplifier 3 is zero regardless of the extent of air speed.

The input voltage $+\Delta F_p$ (Trim) is fed to the amplifier 3 over line 59 which is connected to a wiper 61 of a trim wheel position potentiometer 63, which is energized at its ends by equal and opposite reference voltages $+V$ and $-V$ and whose center tap is grounded. The wiper 61 is positioned in accordance with the operation by the student pilot of a rudder trim wheel 64 through connections generally indicated at 65. The effect of operation of the trim wheel 64 is discussed in detail in the aforesaid pending Grandmont application and may be restated briefly to effect, in simulation of the effect produced in an actual aircraft, relief or reduction of the force which the student pilot must exert on the rudder pedal. With the trim wheel 64 in its neutral position the wiper 61 contacts a grounded center tap of potentiometer 63 so that the value of the input voltage $+\Delta F_p$ (Trim) is zero.

The input voltages $-F'_p(\delta_r)$ and $-\Delta F_p$ (Spring) are derived respectively over lines 67 and 69 from the wipers 23 and 25 of the potentiometers 19 and 21, which wipers are positioned according to the position of the pedal 1 and motor 13 as previously indicated. Potentiometers 19 and 21 also have grounded center taps, so that when the pedal 1 is in its neutral position the input voltages to amplifier 3 on lines 67 and 69 are zero. Potentiometer 19 is energized at opposite ends by the previously discussed airspeed squared voltages $+V_i^2$ and $-V_i^2$, so that the position of the wiper 23 represents resistance force to pedal deflection in accordance with position of the pedal and air speed found in an actual aircraft having no pre-load pedal spring. Potentiometer card 21 is energized at opposite ends by the reference voltages $+V$ and $-V$. The voltage on line 69 derived in accordance with the position of the wiper 25 represents the resistance forces to pedal deflection in accordance with rudder position due to the rudder spring in the actual aircraft. The position of the rudder is related to the position of the pedal but according to a non-linear relation, and to this end a resistor 71 is connected from the line 69 to ground, so that as the wiper 25 is positioned along the contour of potentiometer 21 the voltage on line 69 varies non-linearly with pedal displacement, yet linearly with rudder position.

For computation of the resistance force due only to pre-loading of the pedal spring as previously discussed with reference to Fig. 2, the output of the amplifier 3 representing summation of pedal forces except pre-load force is tapped from line 39 over line 71' to an end of a potentiometer card 73 which is part of the automatic gain control system 11 and whose other end is grounded. The wiper 75 of the potentiometer is positioned by the motor of an air speed squared servo system $V_i^2$ generally indicated by 77. In the case of servo 77 the feedback generator is omitted and the feedback voltage $E_{fb}$ is obtained from the output of the servo amplifier instead. The other input voltages to the $V_i^2$ servo and also its operation are described in the aforesaid Stern and Theobald patent. The wiper 75 is positioned closely to its grounded end for the case of high air speed and close to its "hot" other end for the case of a grounded airplane to effect automatically the relative displacement of the curves 208c", 206c" and 204c" in the manner previously discussed. Since the gain control function need not be too exact, a servo representing air speed rather than air speed squared may be employed for the servo 77; if desired the potentiometer 73 may be wound to a squared function to retain accuracy, but this is not absolutely necessary. The voltage at potentiometer 75 is fed to a pedal spring force (PSP) summing preamplifier 79 over line 81, the other input signal to the preamplifier 79 being a feedback signal. The output of preamplifier 79 is applied through a resistor 83 which is part of the limiter network 7 previously referred to and serves to provide sine wave clipping together with the diodes 85 and 87 whose respective cathode and anode are connected to the other end of resistor 83 and whose remaining electrodes are grounded. Thus a symmetrically limited voltage appears at the junction of resistor 83 and diodes 85 and 87 from which it is fed through a resistor 89 having a value equal to the sending end impedance of the low pass filter 9, through said filter 9, and with sine wave restored, over line 91 as input voltage $-F'_p$ (PSP) to the servo summing amplifier 5. A resistor 93 is connected from the output of the low pass filter 9 to ground and has a value equal to the terminating impedance of the low pass filter. The preamplifier 79 produces a phase shift of 180° to off-set the 180° incidental phase shift produced by the low pass filter 9, thereby to assure that the two input voltages $F'_p$ and $-F'_p$ (PSP) to the amplifier 5 shall be in phase. A capacitor 95 shunts diodes 85 and 87 to provide a small phase correction for low pass filter 9. The combined action of the gain control means 11, the limiter means 7 and the low pass filter means 9 produces the responses 208a', 206a" and 204a" in the manner previously described.

In simulation of effects actually experienced in an aircraft, means are provided to produce shaking or rocking or oscillating of the pedal in the event that the pilot deflects the pedal to an angle in excess of limiting angles prescribed for the rudder, ±15° in the case of the DC7C. Since such shaking effect should not be experienced when the simulated craft is grounded, an H servo generally indicated at 97 operates a single-pole double-throw switch 99 through the agency of a cam 101 which is actuated by the servo motor through connections 103. The voltages applied to the input H servo 97 and also the operation of cams similar to cam 101 are described in detail in a pending application of Stern and Sherman for "Flight Training Apparatus for Simulating Low Level Flight," S.N. 502,872, filed April 21, 1955, and assigned to the assignee of the present application. The operation is such that when the simulated craft is off-ground as sensed by the servo 97, the grounded movable contact 105 of switch 99 engages its left stationary contact 107 to energize a relay 109 whose coil 111 is connected to contact 107 and to the terminal of a direct voltage source $+E(D.C.)$. With contact 105 engaging the other stationary contact 112 corresponding to an on ground condition of the simulated aircraft, energization of relay 109 is precluded. With relay 109 energized the voltage $+E(D.C.)$ is routed through its normally open contact 119, over line 121 to normally open contacts 123 and 125 of a double-pole, double-throw switch 127 which is actuated by pedal 1 through the connections indicated at 29. The arrangement is such that the contact 123 closes only upon deflection of the rudder in excess of 15° in one direction, and the contact 125 closes only on deflection of the rudder in excess of 15° in the opposite direction. The movable contacts 129 and 131 of the switch 127 are tied together and connected to an end of a coil 133 of a shake relay 135, the other end of coil 133 being grounded. Thus relay 135 is energized only if the simulated flight is off-ground and the rudder is deflected through an angle in excess of 15° in either direction, which corresponds to a pedal displacement of 17.9° in either direction.

The inputs $PSH_1$ and $PSH_2$ to the amplifier 5 are normally grounded through the normally closed contacts 137 and 139 of relay 135. When relay 135 picks up, a pair of oscillators 141 and 143 are connected through respective NO contacts 137' and 139' to the inputs $PSH_1$ and $PSH_2$. Oscillator 141 generates a frequency of approximately 59 cycles or even closer to the line frequency of 60 cycles and produces a primary shaking effect on pedal 1 at the beat-frequency rate of 1 cycle per second. A frequency of 59 cycles, i.e. very close to the operating frequency of the servo 15 of 60 cycles, produces approximately the same effect on the servo system as a 60 cycle input $PSH_1$ varying continuously in phase with respect to the operating phase of the servo. This effect, as is well-known is one of continuous hunting of the servo motor 13 in accordance with the continuous phase change with reference to the voltage $E_1$ across winding 33. The second oscillator 143 is operated at a frequency somewhat more remote from 60 cycles, herein 55 cycles, and produces a second beat-frequency effect of 5 cycles per second, which modulates the first shaking effect at a 5 cycle rate. The combined shaking effects simulate to a high degree of realism corresponding shaking effects experienced in an actual airplane.

What is claimed is:

1. In an aircraft trainer having a plurality of simulated flight control members positionally operable by a student pilot in simulation of the operation of corresponding flight control members of an actual aircraft, respective electromechanical means connected to at least some of said simulated flight control members for producing respective electrical signals in accordance with the positions of the respective members, and a flight computer comprising a plurality of computing systems responsive to said signal producing means and to each other to produce output signals representing simulated flight conditions corresponding to actual flight conditions resulting from like operation of the corresponding actual aircraft flight control members, said computing systems including means for computing airspeed of the simulated aircraft: the invention of apparatus for producing a force in opposition to operation of one of said simulated flight control members with a force-deflection characteristic simulating that of a corresponding actual flight control member provided with a preload spring, said apparatus comprising electromechanical means connected to said one simulated flight control member for producing an electrical signal representing the position of said one simulated flight control member, electromechanical means operatively connected to said one simulated flight control member and to said airspeed computing means for producing an electrical signal in accordance with airspeed of the simulated aircraft and the position of said one flight control member, electrical means for combining the two last-mentioned signals, means for limiting the combined signal to obtain an electrical signal representing the preload spring component of the force of resistance to the operation of the actual flight control member which corresponds to said one simulated flight control member, said obtained signal varying substantially linearly with said combined signal up to a predetermined magnitude of said combined signal and remaining substantially constant as said combined signal increases beyond said predetermined magnitude, electrical means for combining the limited and aforesaid combined signals to produce a resultant signal representing summation of the forces resisting operation of the actual flight control member corresponding to said one simulated flight control member, and electromechanical torque means responsive to said resultant signal for exerting on said one simulated flight control member a total force resisting its operation in simulation of the total resistance force exerted on the corresponding actual flight control member when operated under like circumstances and in like manner.

2. Apparatus as specified in claim 1 with the inclusion of a simulated trim control and means for applying to the first-named combining means a signal representative of the position of said trim control.

3. Apparatus as specified in claim 1, wherein the flight computer includes a side-slip computing system, further provided with means operatively connected to said flight computer for applying to the first-named combining means a signal in accordance with side-slip and air speed of the simulated flight as computed by the respective computing systems.

4. Apparatus as specified in claim 1 wherein the first-mentioned combined signal is an alternating voltage and wherein the limiting means comprises means for clipping said alternating voltage.

5. Apparatus as specified in claim 1 with the inclusion of means connected to the one simulated flight control member and to the second-named combining means for producing a signal effective to cause said second-named combining means to shake the simulated control when the student pilot exceeds predetermined limits of displacement of said control.

6. Apparatus as specified in claim 1 wherein the signals are alternating voltages and wherein the limiting means comprises means for clipping the first-mentioned combined signal and low pass filter means for sine wave restoration of the clipped voltage.

7. Apparatus as specified in claim 6 with the inclusion in the limiting means of means for varying the magnitude of the first-mentioned combined signal in accordance with an air speed function signal produced by the air speed computer.

References Cited in the file of this patent

UNITED STATES PATENTS

| | | |
|---|---|---|
| 2,486,488 | Lukacs | Nov. 1, 1949 |
| 2,519,233 | Davis et al. | Aug. 15, 1950 |
| 2,695,145 | Lear | Nov. 23, 1954 |
| 2,784,501 | Stern et al. | Mar. 12, 1957 |
| 2,804,698 | Grandmont | Sept. 3, 1957 |
| 2,808,659 | Dehmel | Oct. 8, 1957 |
| 2,851,795 | Sherman | Sept. 16, 1958 |
| 2,860,423 | Dehmel | Nov. 18, 1958 |